United States Patent
Choi et al.

(10) Patent No.: US 11,656,966 B2
(45) Date of Patent: May 23, 2023

(54) LOCAL COMPUTING CLOUD THAT IS INTERACTIVE WITH A PUBLIC COMPUTING CLOUD

(71) Applicant: Computime Ltd., New Territories (HK)

(72) Inventors: Hung Bun Choi, Hong Kong (CN); Gideon Sui Pang Tsang, Hong Kong (CN); Chun Kit Chu, Hong Kong (CN)

(73) Assignee: Computime Ltd., New Territories (HK)

( * ) Notice: Subject to any disclaimer, the term of this patent is extended or adjusted under 35 U.S.C. 154(b) by 396 days.

(21) Appl. No.: 16/840,648

(22) Filed: Apr. 6, 2020

(65) Prior Publication Data

US 2021/0311846 A1    Oct. 7, 2021

(51) Int. Cl.
*H04L 12/28* (2006.01)
*H04L 67/12* (2022.01)
(Continued)

(52) U.S. Cl.
CPC ........ *G06F 11/3006* (2013.01); *G06F 11/076* (2013.01); *G06F 11/3013* (2013.01);
(Continued)

(58) Field of Classification Search
None
See application file for complete search history.

(56) References Cited

U.S. PATENT DOCUMENTS

| 7,200,809 B1 | 4/2007 | Paul et al. |
| 10,178,177 B2 | 1/2019 | McLaughlin et al. |

(Continued)

FOREIGN PATENT DOCUMENTS

| JP | 2020-010311 A | 1/2020 |
| KR | 10-2015-0082743 A | 7/2015 |

OTHER PUBLICATIONS

Dickson, B. "How fog computing pushes IoT intelligence to the edge", TechCrunch.com, Aug. 2, 2016 [retrieved on Nov. 5, 2022]. Retrieved from the Internet: <URL: https://techcrunch.com/2016/08/02/how-fog-computing-pushes-iot-intelligence-to-the-edge>. (Year: 2016).*

(Continued)

*Primary Examiner* — Kevin T Bates
*Assistant Examiner* — Dae Kim
(74) *Attorney, Agent, or Firm* — Banner & Witcoff, Ltd.

(57) ABSTRACT

A home computing cloud (HCC) supports one or more Internet of Things (IoT) devices, possibly with different connectively protocols, in a local environment. The HCC often reduces the amount of data traffic sent to a public computing cloud (PCC) by locally processing collected device data rather than by sending the device data to the PCC for processing. This approach reduces the amount of data traffic sent over the network, improves data privacy and helps to maintain a desired quality of service level. In order to do so, the HCC may download an appropriate data analytic model from the PCC, train the model, execute the trained model to obtain prediction information from collected IoT device data, and upload the trained model to the PCC. Alternatively, the HCC and PCC may execute sub-models of the analytic model and exchange the outputs of the sub-models with each other.

17 Claims, 10 Drawing Sheets

(51) Int. Cl.
  *G06F 11/30*  (2006.01)
  *G06N 3/08*  (2023.01)
  *G06F 11/07*  (2006.01)
  *G06F 18/214*  (2023.01)
  *G06N 20/00*  (2019.01)

(52) U.S. Cl.
  CPC .............. *G06F 18/214* (2023.01); *G06N 3/08* (2013.01); *H04L 12/2825* (2013.01); *H04L 12/2834* (2013.01); *H04L 67/12* (2013.01); *G06N 20/00* (2019.01)

(56) References Cited

U.S. PATENT DOCUMENTS

| | | | |
|---|---|---|---|
| 2013/0128043 A1 | 5/2013 | Avnery | |
| 2014/0149599 A1 | 5/2014 | Krishna et al. | |
| 2015/0281871 A1 | 10/2015 | Poulsen | |
| 2015/0288678 A1 | 10/2015 | Chen | |
| 2018/0191729 A1 | 7/2018 | Whittle et al. | |
| 2018/0246484 A1 | 8/2018 | Zimmerman et al. | |
| 2018/0314938 A1* | 11/2018 | Andoni | G06N 3/086 |
| 2019/0123967 A1 | 4/2019 | Dotchkoff et al. | |
| 2019/0260808 A1 | 8/2019 | Elghandour | |
| 2019/0260830 A1* | 8/2019 | Karjee | H04L 69/04 |
| 2019/0369984 A1 | 12/2019 | Malladi et al. | |
| 2020/0145337 A1* | 5/2020 | Keating | G06F 9/5011 |
| 2020/0213360 A1* | 7/2020 | Ojha | H04W 12/63 |
| 2021/0166083 A1* | 6/2021 | Zhang | G06N 20/20 |

OTHER PUBLICATIONS

Jul. 27, 2021—(WO) International Search Report & Written Opinion—App. No. PCT/US2021/025943.

* cited by examiner

LOCAL COMPUTING CLOUD THAT IS INTERACTIVE WITH A PUBLIC COMPUTING CLOUD

TECHNICAL FIELD

Aspects of the disclosure relate to supporting a local computing cloud that is interactive with a public computing cloud. The local computing cloud may be located in a home and may support one or more Internet of Things (IoT) devices. An analytic model may be downloaded from the public computing cloud and locally executed. Reinforcement training may also be locally performed without externally conveying device data and user behavior information, vastly reducing data traffic that may jeopardize data privacy.

BACKGROUND OF THE INVENTION

Internet of Things (IoT) applications often rely on remote and centralized servers to collect input data, and based on the current input as well as the historical data, to generate certain actions. This approach typically requires IoT devices, such as smart sensors, thermostats, and smart appliances, to exchange data between themselves and a remote server, such as a public computing cloud. With another approach, a gateway may be needed to convert data from one connectivity protocol to another in order to send data from the end devices to server, for example, ZigBee to WiFi. The huge amount of data transmission between the end devices and server means an expensive service cost. Moreover, this may create a huge amount of data traffic in the network, which may result in extra network latency, data loss during transmission, or an expensive maintenance cost in order to maintain a desired quality of service level. In addition, data security and privacy are an important concern when storing large amounts of personalized data in a public computing cloud.

SUMMARY OF THE INVENTION

A home computing system (which may be referred to as a ☐home computing cloud☐) integrates a communications gateway, WiFi router, cloud server, and mass storage device to support one or more Internet of Things (IoT) devices in a local environment such as a residential home. Because the home computing cloud (HCC) locally processes collected device data rather than sending the device data to a public computer cloud (system) for processing, the home computing cloud often reduces the amount of data traffic sent to a public computing cloud (PCC). This approach improves network latency, reduces data loss during transmission, and helps to maintain a desired quality of service level.

In order to do so, a HCC may download an appropriate data analytic model (which may be referred to as a ☐model☐ and selected from a plurality of data analytic models) from a PCC based on configuration information (for example, the types of supported IoT devices). The HCC can then locally execute the model by obtaining device data from one or more IoT devices, apply some or all of the device data to the model, and obtain a predictive result from the model. The predictive result may then be applied to one or more of the supported IoT devices to affect the operation of the one or more IoT devices.

With another aspect, a HCC sends a subset of the device data to a PCC for further processing and receives decision information based on the subset of data. For example, the subset of device data may represent one or more signal characteristics of a complex signal (for example, multimedia signals including voice, music, image or video signals) that require intensive processing that the HCC may be unable to support. In an example approach for facial recognition, the HCC may implement the image pre-processing layer and feature extraction layer of an analytic model and send the resultant data to the PCC for analysis and decision making. The HCC applies the received result as well as other device data (corresponding to model inputs) to a downloaded data analytic model.

With another aspect, the PCC executes the input processing layers of the predictive model and sends the corresponding outputs to the PCC. The PCC then executes all the remaining hidden layers and sends the corresponding outputs of the final hidden layer back to the HCC. The HCC then executes the output layer. This approach typically eliminates sensitive information being sent over the internet and consequently enhances data privacy over the internet.

With another aspect, the distribution of a work load for executing the model may be based on the computer power of the HCC (such as sending raw data to the PCC for the entire process); the amount of data traffic (such as sending only the feature data to the PCC for processing the remaining tasks); data privacy (such as sending a mathematically transformed data within a layer of the model to the PCC to continue the analysis); the consistency of the model parameters (such as the HCC executing layers with parameters that are fixed and the PCC may executing layers with parameters that are changing continuously via reinforcement training).

With another aspect, a HCC may have sufficient computing resources for executing more complex tasks, such as training a deep neural network. The HCC may download an appropriate template of a data analytic model from the PCC, train the model locally, and execute the trained model to obtain prediction information from the collected IoT device data.

With another aspect, both a HCC and a PCC may execute and train the same data analytic models (for example, assistant training). However, the learning rate at the HCC and PCC may be different (for example, because of more computational capability at the PCC). While the HCC is executing and training the local model based on IoT device data, the HCC also sends the device data to the PCC. The PCC executes and trains with the same device data and sends error measures back to the HCC. The HCC compares the error measures from the two clouds and continues the training until the error measures from the HCC is lower than a threshold.

With another aspect, a HCC may decide to use to the parameters from the PCC to continue the training, when the error measures from the PCC are continuously lower than or substantially lower than the HCC.

With another aspect, a HCC may decide to use the model trained by the PCC and stop training if the error measure from the PCC reaches the threshold first.

With another aspect, a HCC may upload a trained model to a PCC for archiving, sharing, or optimization.

With another aspect, a PCC may analyze all the received models from other HCC's and optimize a new model. The PCC may distribute the new model to all the HCC's.

With another aspect, a HCC may decide to use the new model completely, use the new model with the parameters from the existing model, or totally ignore the new model. The decision may be based on a comparison to the error measures when executing different models with the empirical data locally stored.

With another aspect, a HCC may continue to run or train a local model, and a PCC may train the new model in parallel with new input data. The HCC continuously sends new input data to the PCC for training the new model until the new model is sufficiently accurate. The HCC may then download the new model for use.

With another aspect, a HCC may request the PCC to use the parameters in the HCC to continuously train the new model.

With another aspect, subjective weightings may be applied when calculating an error, based on an application scenario, in training the model.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

Figure 1:
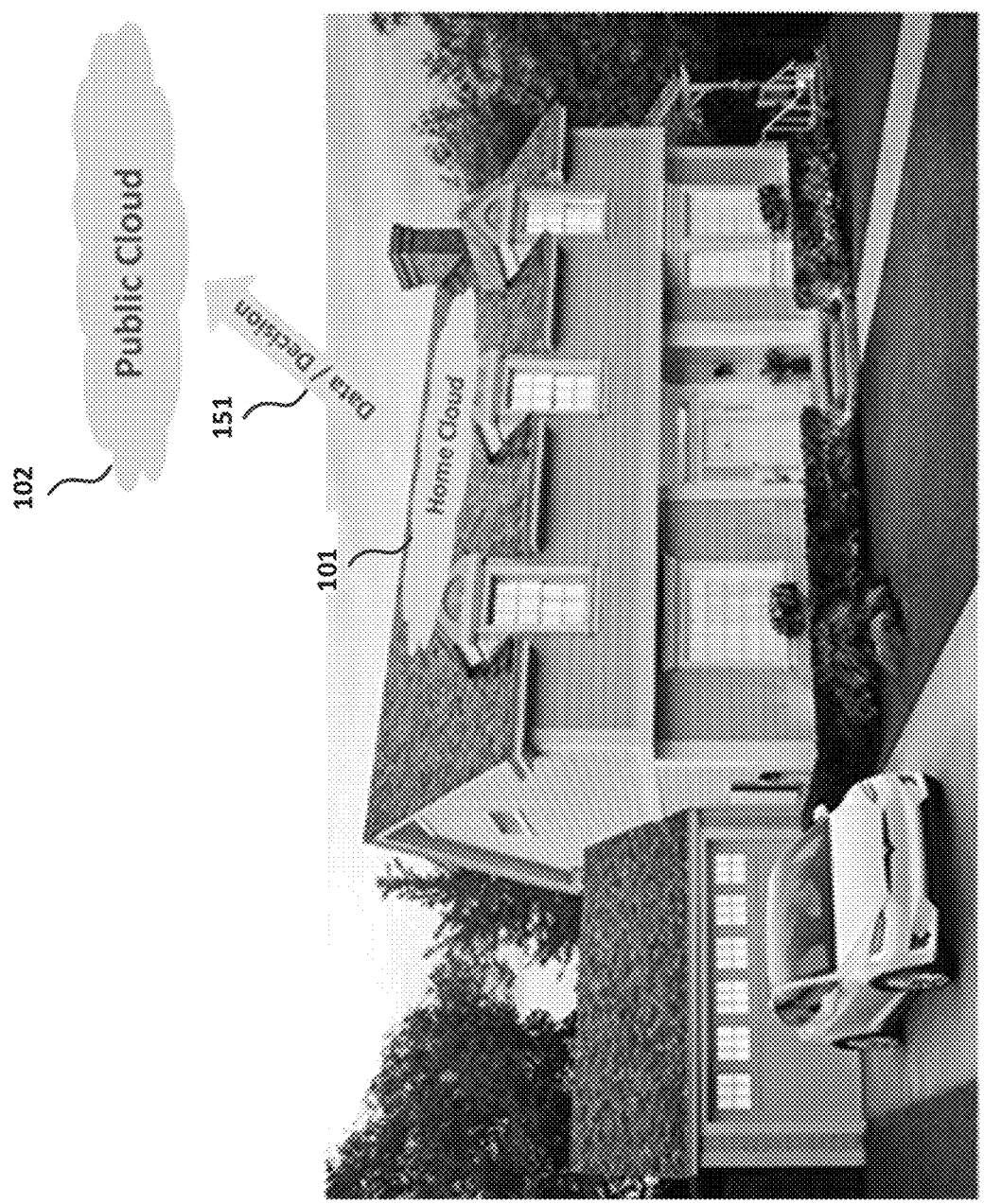
FIG. 1 shows a home environment in which a home computing cloud (HCC) is interactive with a public computing cloud (PCC) in accordance with an embodiment.

A □HCC□ (home computing cloud) may not be limited to a residential home and may support other types of entities such as a business or building. Consequently, a □HCC□ may be construed as a focal computing cloud. □Also, a □cloud□ may be referred to a computing system or the like.

According to an aspect of the embodiments, a HCC integrates a communications gateway, WiFi router, cloud server, and mass storage device to support one or more Internet of Things (IoT) devices in a local environment such as a residential home. Because the HCC locally processes collected device data rather than sending the device data to a public computing cloud (PCC) for processing, the HCC often reduces the amount of data traffic sent to a PCC. This approach improves network latency, reduces data loss during transmission, and helps to maintain a desired quality of service level. In order to do so, a HCC may download an appropriate data analytic model (which may be referred to as a □model□) from a PCC based on configuration information (for example, the types of supported IoT devices). The HCC can then locally execute the model by obtaining device data from one or more IoT devices, apply some or all of the device data to the model, and obtain a predictive result from the model. The predictive result may then be applied to one or more of the supported IoT devices to affect the operation of the one or more IoT devices.

The HCC may include one or more IoT devices that are located in a home. Embodiments support a variety of IoT devices, including but not limited to, smart thermostats, appliances, lighting devices, security devices, and so forth.

The HCC may interact with a PCC in order to exchange information that is pertinent to the one or more IoT devices. The information may include data (for example, temperature measurements) provided by the one or more IoT devices and information indicative of actions (for example, a mode of operation) to be performed by the one or more IoT devices.

The PCC (which may be referred to a □public cloud□ may provide computing services offered by third-party providers over the public Internet, making them available to anyone who wants to use or purchase them. The services may be free or sold on-demand, thus allowing customers to pay only per usage for consumed CPU cycles, storage, or bandwidth.

With another aspect of the embodiments, algorithms may be available for training data analytic models locally. Reinforcement (machine) learning may also be added to provide machine learning capability to the HCC. By processing the data locally, privacy of users may be substantially improved by limiting the amount of data and types of data sent via the network and stored in a PCC.

With another aspect of the embodiments, a HCC (home computing system) locally executes both a data analytic model and reinforcement learning.

With another aspect of the embodiments, a data analytic model is partitioned into two sub-models. The first sub-model includes an input processing layer of a data analytic model and is executed by a home computing system (cloud). The second sub-model includes the hidden layers of the data analytic model and is executed by the public computing cloud. With this approach, raw data is locally kept at the computing system, thus protecting the privacy of a user.

With another aspect of the embodiments, a data analytic model is partitioned into three sub-models. The first sub-model and third sub-model include the input layer and the output layer, respectively, and are executed by the home computing system (cloud). The second sub-model includes only the hidden layers and is executed by the public computing cloud. With this approach, the privacy of a user is further protected by locally maintaining both the raw input data as well as the predictive output.

With another aspect of the embodiments, assistant learning enables training in a public computing cloud while executing a data analytic model at a home computing system.

With another aspect of the embodiments, assistant learning enables parallel training in both a public computing cloud as well as a home computing cloud while executing a data analytic model at the home computing system.

FIG. 1 shows a home environment in which a HCC 101 is interactive with a PCC 102 via data channel 151 in accordance with an embodiment.

An IoT device (not explicitly shown) may be an interrelated computing device (for example, a smart thermostat or appliance) within a home that provides sent information and obtains received information via HCC 101. The received information may be indicative of one or more actions that the IoT device should perform.

While FIG. 1 depicts an operating environment spanning a home, embodiments may span other local environments such as a building or a business location.

Data traffic capacity, data security and data privacy are important considerations when implementing an Internet of Things (IoT) system. By minimizing data traffic and carefully selecting the types of the data to be sent on data channel 151 between PCC 102 and the application environment supported by HCC 101 as well as by minimizing the amount of data and data types stored inside PCC 102, the exposure of the data from unauthorized access may be reduced. Moreover, the data traffic may be reduced and hence the cost in using the service provided by PCC 102. By storing data within HCC 101 and conducting data analytic and machine learning from within HCC 101, services may be maintained when an internet connection is inaccessible. Moreover, the latency introduced from the internet connection may be eliminated. However, one may not completely circumvent the services provided by PCC 102 as it often provides computational power and software services in which HCC 101 may not be able to provide.

Figure 2:
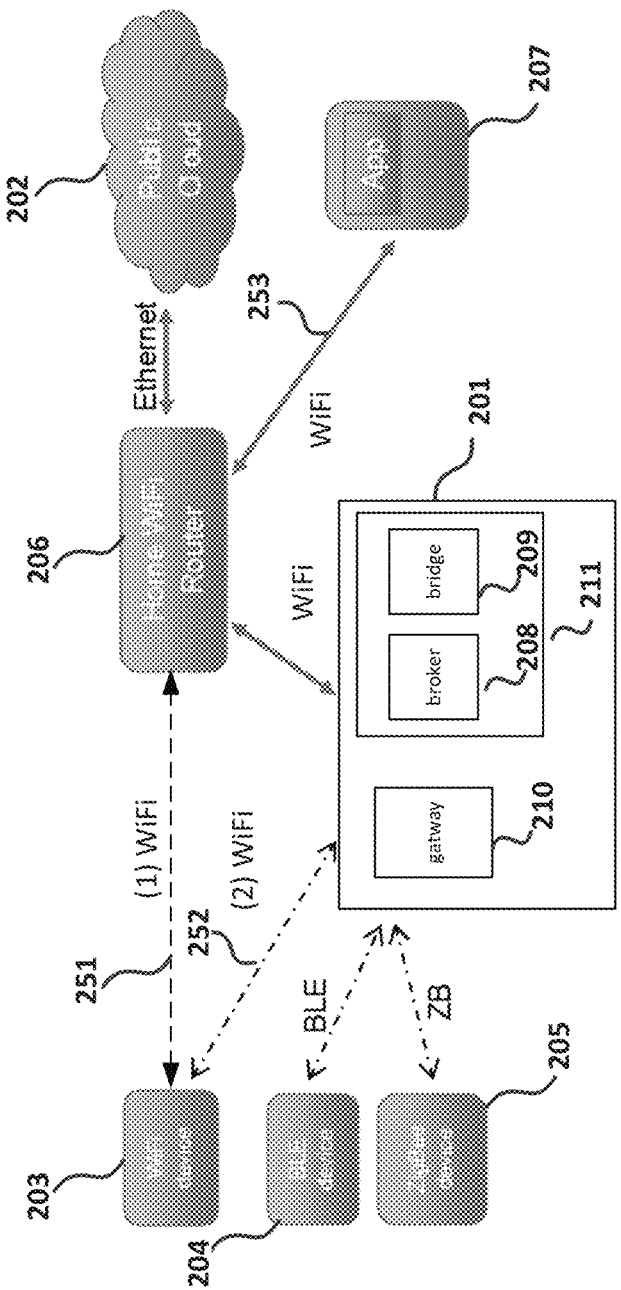
FIG. 2 shows a HCC without a WiFi router capability in accordance with an embodiment.

In deciding what data and functions are kept locally within HCC 101 and what data and services are allocated to PCC 102, one approach is storing discrete time interval data (for example, sensor data, manual setting, and the like) in HCC 101 together with a machine learning algorithm and the data analytic model as will be discussed in further detail. HCC 101 may continuously send an update of the number of supported IoT devices (for example, devices 203-205 as shown in FIG. 2) and the nature of the devices to PCC 102 via data channel 151. HCC 101 may also send information about the trained model (for example, the parameters of the analytic model and the error measure) periodically to public computing cloud 102.

PCC 102 may collect data from all available HCCs 101 and 401 (as will be further discussed with FIG. 4) and train a new pre-trained model based on the collected data, for example, a model template. The new pre-trained model may then be distributed back to each HCC 101 and 401. Alternatively, PCC 102 may inform HCC 101 and/or 401 that a new pre-trained model is available, where HCC 101 and/or 401 may decide whether to download it via data channel 151 based on a predetermined criterion.

As will be discussed in further detail, some or all of the data from the previous model may be directly applied to the model template. Alternatively, reinforcement learning may be applied using the model template with model data stored locally or brand new data if no data available.

As will be discussed in further detail, parallel training (machine learning in both the home and PCCs) may be applied when reinforcement learning is being performed. Model parameters may be exchanged during the training. The model to be adopted by the HCC may be chosen based on the error measurement.

PCC 102 may consistently update the machine learning algorithm to HCC 101.

For a continuous time signal (for example, audio, image, and video data), HCC 101 may stream signal data to PCC 102. When a data analytic model is supported at PCC 102, the result from the model may be returned to HCC 101.

Alternatively, the analytic model may be split into two parts (for example, sub-models) and partially executed at the HCC and PCC. The data exchange between the two clouds may be the parameters in one or more layers of the analytic model. This approach may reduce the amount of data to be exchanged between the two clouds. Moreover, the privacy may be maintained with respect to sending the raw data stream.

Alternatively, the analytic model may be split into three sub-models and partially executed at the HCC and PCC. With this approach, the input processing layers and output layer(s) of the analytic model are executed at the HCC, and the hidden layers are executed at the PCC. In this way, the raw input data and predictive outputs, which likely contain private information about the device owner, are kept locally and not externally exposed.

Alternatively, a model may be trained in PCC 102, downloaded from PCC 102 to HCC 101, and locally executed by HCC 101. The decision for retraining a new model may be triggered by the owner (user). Examples include adding a new device in the model for recognition, adding a new rule in the model, and so forth.

FIG. 2 shows a HCC 201 associated with a separate WiFi router 206 that interacts with PCC 202 in accordance with an embodiment.

The interactions between local IoT devices 204-205 may be supported by protocol gateway 210 and IoT message translator 211 executing at HCC 201. IoT devices 204-205 communicate by the corresponding protocols (for example, Zigbee) via a protocol gateway 210. Protocol gateway 210 passes device messages to IoT message translator 211 that comprises IoT protocol message broker 208 (for example, MQTT broker) or COAP server (not explicitly shown) and IoT protocol message bridge 209 (for example, MQTT/Zigbee bridge). Message translator 211 bridges IoT device messages into IoT protocol messages (for example, MQTT messages). The MQTT messages may be directed to other IoT devices connected to HCC 201, to the rule engine, or to PCC 202. As an example, a device message from the Zigbee device 205 may be sent to HCC 201 via Zigbee gateway 210. Device data may be extracted from the device message and sent to the analytic model for processing. At the same time the device message may be passed to MQTT/Zigbee bridge 209 and MQTT broker 208 to reach PCC 202 via home WiFi router 206.

WiFi devices (for example, device 203) that support the MQTT client may also connect to MQTT broker 208 within HCC 201.

Device data collected by HCC 201 may be stored into a mass data storage device (not explicitly shown) and thus the additional cost to send the collected data back and forth with PCC 201 is circumvented.

The communication between WiFi device 203 and HCC 201 may occur through two different paths 251 or 252, depending on which WiFi access point WiFi device 203 is connected to. For path 251, the MQTT message from WiFi device 203 is routed from home WiFi router 206 to MQTT broker 208 that may further directed to other IoT devices or to PCC 202 via home WiFi router 206. With path 252, WiFi device 203 is directly connected to HCC 201, which is acting as a WiFi access point (AP) and may also connect to the home WiFi router 206 to PCC 202.

User application (app) 207 may interact with HCC 201 and/or PCC 202 via WiFi connection 253.

Figure 3:
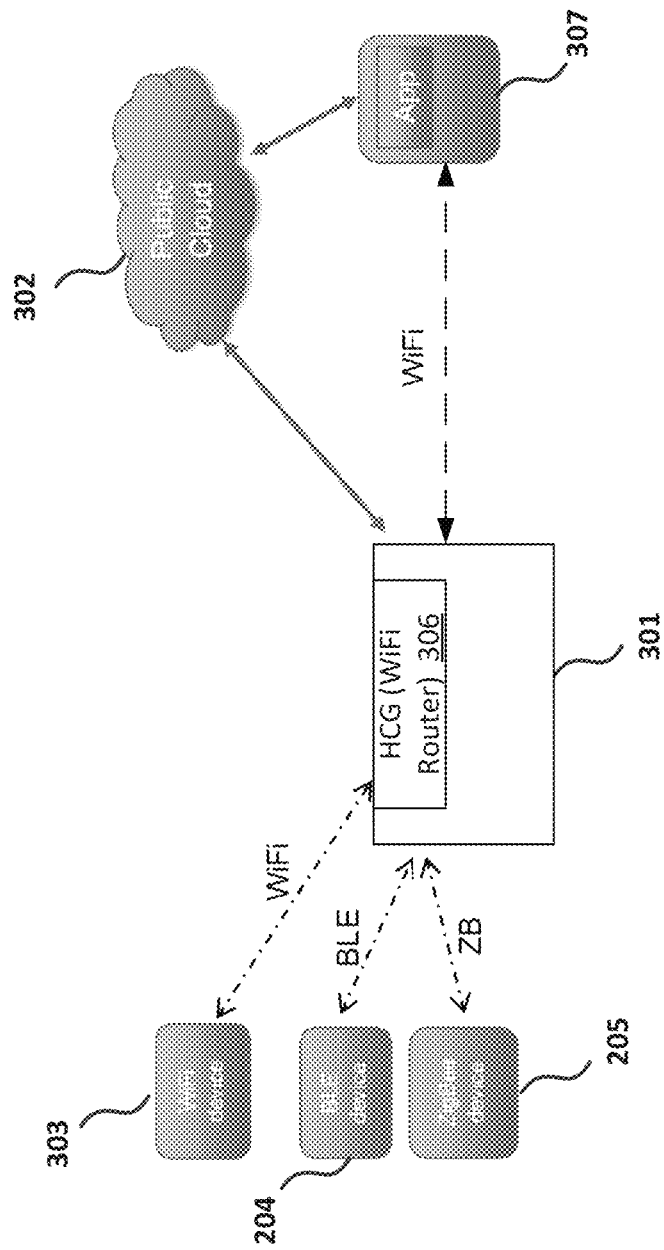
FIG. 3 shows a HCC with a WiFi router capability in accordance with an embodiment.

FIG. 3 shows HCC 301 with a WiFi router capability in accordance with an embodiment. Because HCC 301 includes a WiFi router 306, all WiFi devices (for example, device 303) may be connected to it for accessing internet services to user applications 307 and/or PCC 302. Moreover, mobile device 307 in close proximity may also be connected to HCC 301 for accessing internet services.

Figure 4:
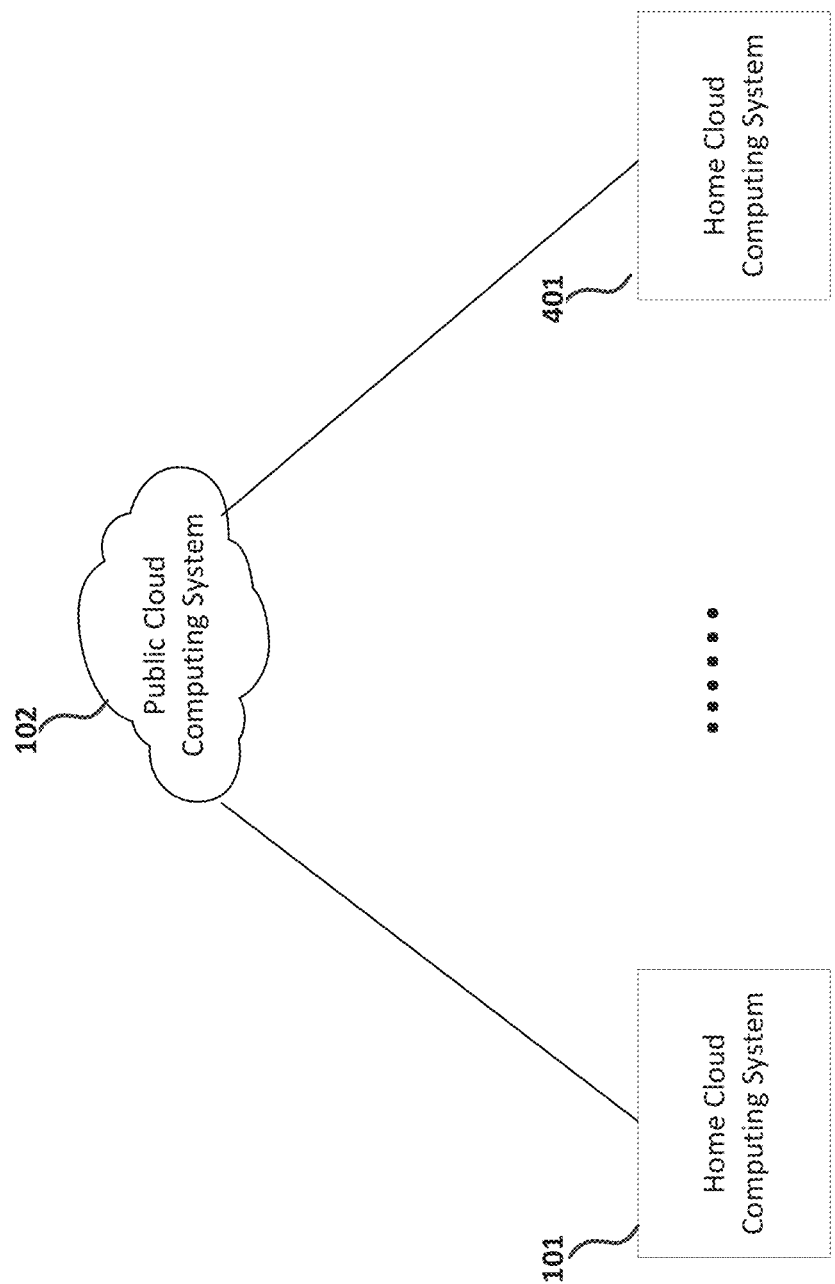
FIG. 4 shows a PCC that is interactive with a plurality of HCC's in accordance with an embodiment.

FIG. 4 shows PCC 102 that is interactive with a plurality of HCC's including HCC's 101 and 401 in accordance with an embodiment. Consequently, PCC 102 may obtain data about data analytic models executing on the plurality of HCC's and may train a mirrored model executing on PCC 102. PCC 102 may subsequently distribute the trained model to one or more HCC's so that the trained model can be locally executed.

Figure 5:
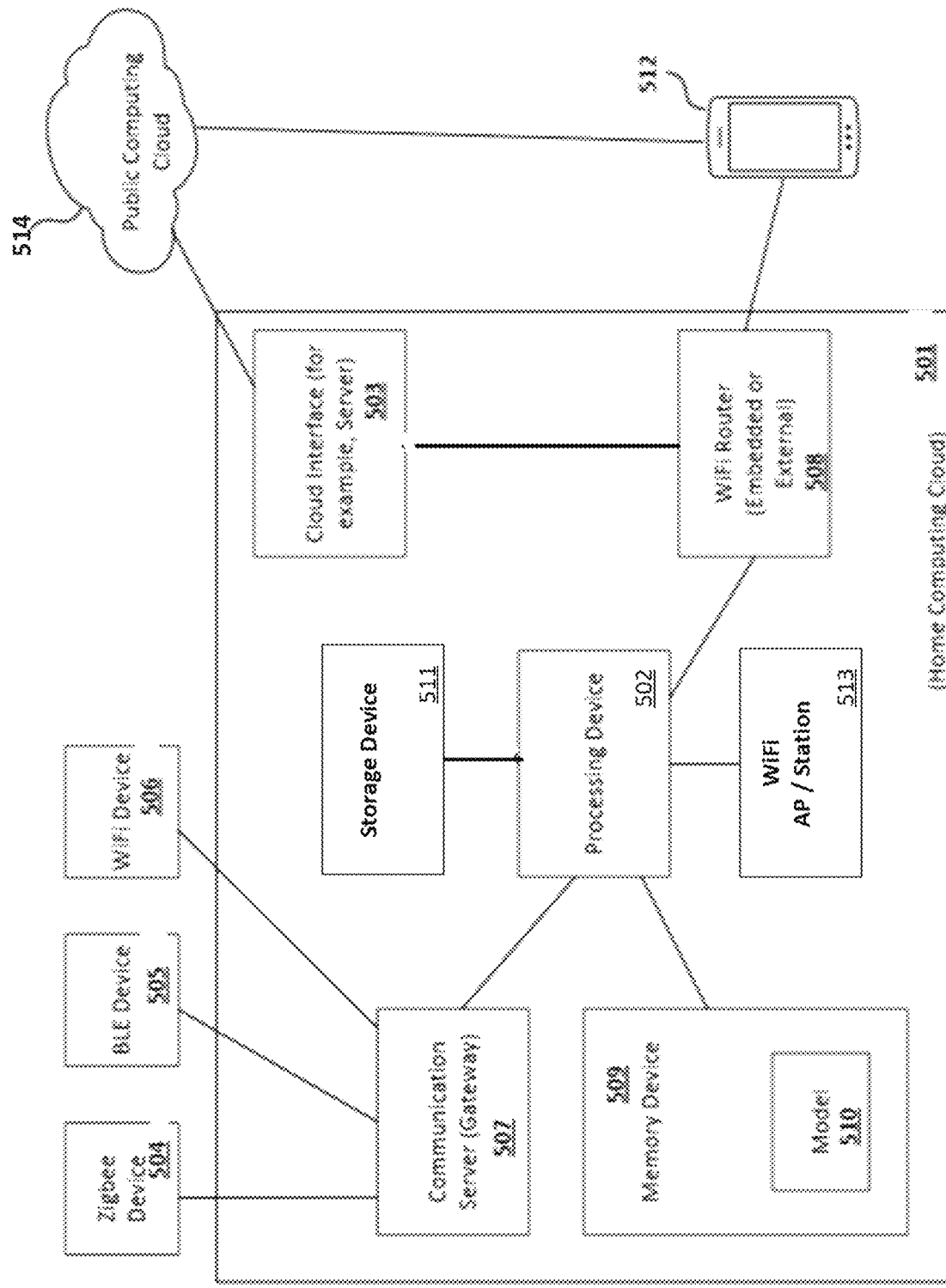
FIG. 5 shows a HCC that is interactive with a PCC and a user application in accordance with an embodiment.

FIG. 5 shows HCC 501 that is interactive with PCC 514 and user application 512 in accordance with an embodiment.

Similar to FIGS. 2 and 3, HCC 501 interacts with IoT devices 504-506 via communication server 507, PCC 514 via cloud interface 503, and mobile device 512.

HCC 501 comprises processing device 502, cloud interface 503, communication server 507, memory device 509, and storage device 511. In addition, HCC 501 may include embedded WiFi router 508 with some embodiments (for example, as shown in FIG. 3).

Processing device 502 controls operation of HCC 501 by executing computer readable instructions stored on memory device 509. For example, processing device 502 may execute computer readable instructions to perform a processes 600-1000 shown in FIGS. 6-10, respectively. Embodiments may support a variety of computer readable media that may be any available media accessed by processing device 502 and include both volatile and nonvolatile media, removable and non-removable media. By way of example, and not limitation, computer readable media may comprise a combination of computer storage media and communication media.

Computer storage media may include volatile and non-volatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

HCC 501 may execute downloaded model 510 at memory device 509 from PCC 514. Machine learning model 510 may comprise a neural network model processing data from IoT devices 504-506 as inputs resulting with one or more decision outputs from model 510.

Home computing cloud 501 may apply reinforcement learning to train the model if there is any corrective action to the predictive output from the model.

Figure 6:
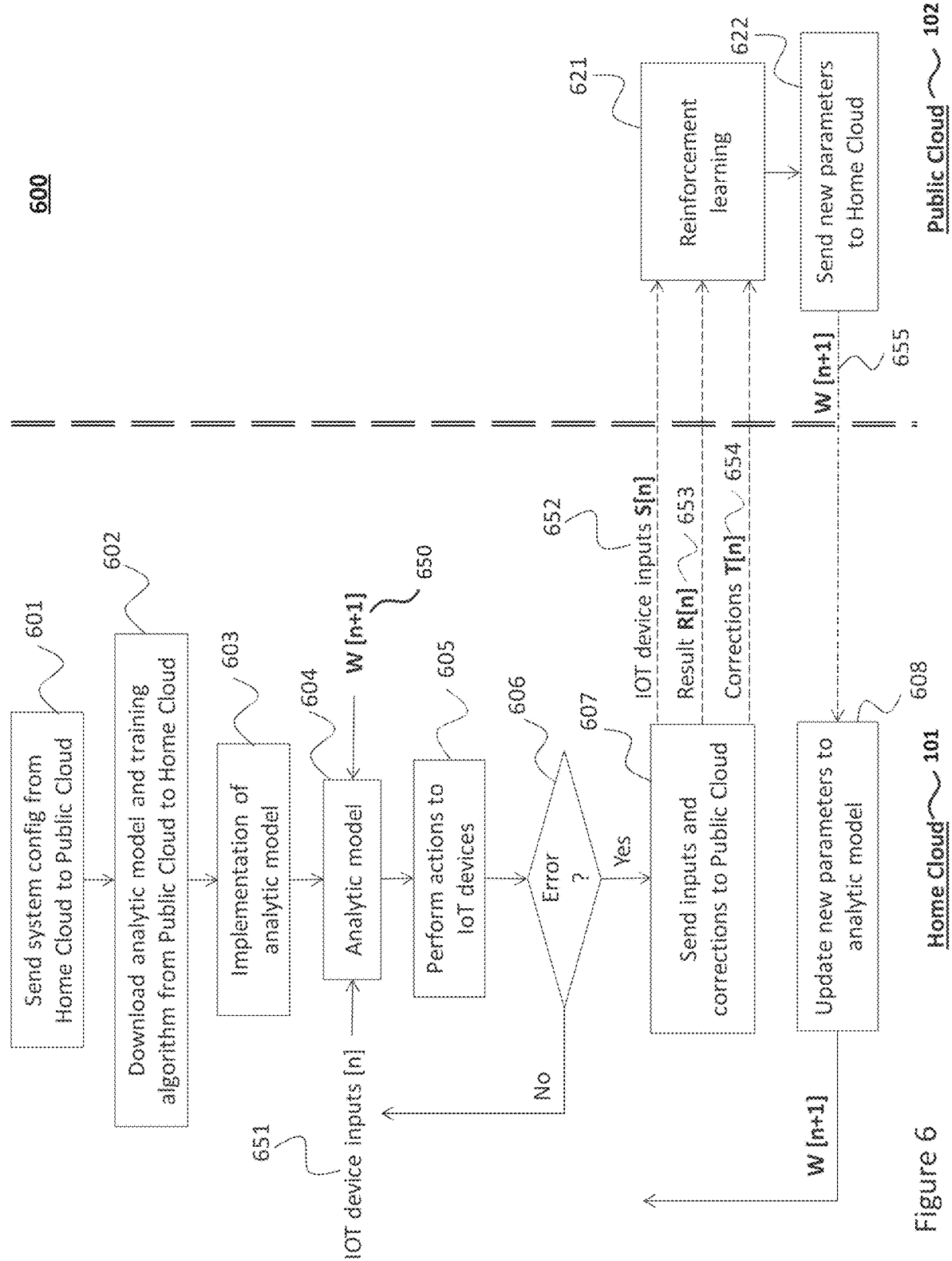
FIG. 6 shows a HCC in accordance with an embodiment, in which the HCC is executing an analytic model while a PCC is executing reinforcement training.

FIG. 6 shows logic flow 600 for executing an analytic model locally. When HCC 101 is setting up or a new device is added, HCC 101 sends system configuration information to PCC 102 at block 601 and downloads the corresponding analytic model at block 602. The analytic model is implemented at block 603 and executed at block 604 based on IoT device inputs 651 and model parameters 650.

As an example, HCC 101 currently supports a thermostat and a presence sensor in a residential home. The thermostat has learned that when there is user presence at home from April to October, the operating mode should be set to cool and temperature should be set to 23 C, while from November to March, the operating mode should be set to heat and temperature should be set to 25 C:

April to October: Presence [0: Mode=Off|1: Mode=Cool, Set_Temperature=23].

November to March: Presence [0: Mode=Off|1: Mode=Heat, Set_Temperature=25].

Continuing the example, when a user adds a smart curtain (a new IoT device) to the ecosystem, HCC 101 sends a configuration information (for example, config file) to PCC 102 about the thermostat, presence sensor, and smart curtain. PCC 102 notifies HCC 101 that a new analytic model is available when the new device (smart curtain) is added. Since the setting □Use of new model template□ is set to □Yes□, HCC 101 downloads the new model template. With the new model, the original settings are applied. Moreover a new input parameter (IoT device input) □curtain opening level (0% fully opened to 100% fully closed)□ is introduced. With the new model provided by PCC 102, the level of curtain opening has no impact to the set temperature:

April to October: Presence [0: Mode=Off|1: Mode=Cool, Set_Temperature=Curtain [0, 100: 23]].

November to March: Presence [0: Mode=Off|1: Mode=Heat, Set_Temperature=Curtain [0, 100: 26]].

During the execution, HCC 101 continuously receives inputs from IoT devices 651 and is processed through the analytic model 604 to obtain predictive results. The predictive results are applied to corresponding IoT devices at block 605.

HCC 101 continuously monitors the IoT ecosystem for any corrections to the predictive results at block 606. If there is any correction made, HCC 101 provides corrections T[n] 654 as feedback to PCC 102 together with the corresponding IoT device inputs S[n] 652 and the predictive results R[n] 653 at block 607, where result information may comprise R[n] 653 and T[n] 654. For example, HCC 101 may conditionally initiate reinforcement learning at PCC 102 and consequently receive updated parameters from PCC 102 in response. HCC can then update the downloaded analytic model.

Continuing the above example, in July, when the smart curtain is about half closed (for example, Curtain=40% closed), the user changes the set temperature to 24 C:

20200701: Presence [1: Mode=Cool, Set_Temperature=Curtain [40: 24]].

When the curtain is slightly closed (for example, Curtain=20% closed), the original set temperature is unchanged (i.e., 23 C), and hence no message received from HCC 101.

In this case, HCC 101 continuously sends the user corrections to PCC 102 whenever available:

20190706: Presence [1: Mode=Cool, Set_Temperature=Curtain [40: 24]].

20190707: Presence [1: Mode=Cool, Set_Temperature=Curtain [50: 24]].

20200713: Presence [1: Mode=Cool, Set_Temperature=Curtain [65: 24]].

20200714: Presence [1: Mode=Cool, Set_Temperature=Curtain [45: 24]].
20200719: Presence [1: Mode=Cool, Set_Temperature=Curtain [60: 24]].
20200720: Presence [1: Mode=Cool, Set_Temperature=Curtain [40: 24]].
20200721: Presence [1: Mode=Cool, Set_Temperature=Curtain [50: 24]].

At PCC 102, reinforcement learning is performed at block 621 to obtain a new set of model parameters (replacing model parameters 650). New parameters 655 is sent to HCC 101 at block 622 and used by the analytic model at block 608 for the next device inputs S[n+1].

Continuing the above example, when reinforcement training is completed, PCC 102 sends the new model parameters to HCC 101. HCC 101 then applies the new parameters in the model. The new parameters are:

April to October, Presence [0: Mode=Off|1: Mode=Cool, Set_Temperature=Curtain [0, 40: 23|40,100: 24]].
November to March, Presence [0: Mode=Off|1: Mode=Heat, Set_Temperature=Curtain [0, 100: 26]].

Figure 7:
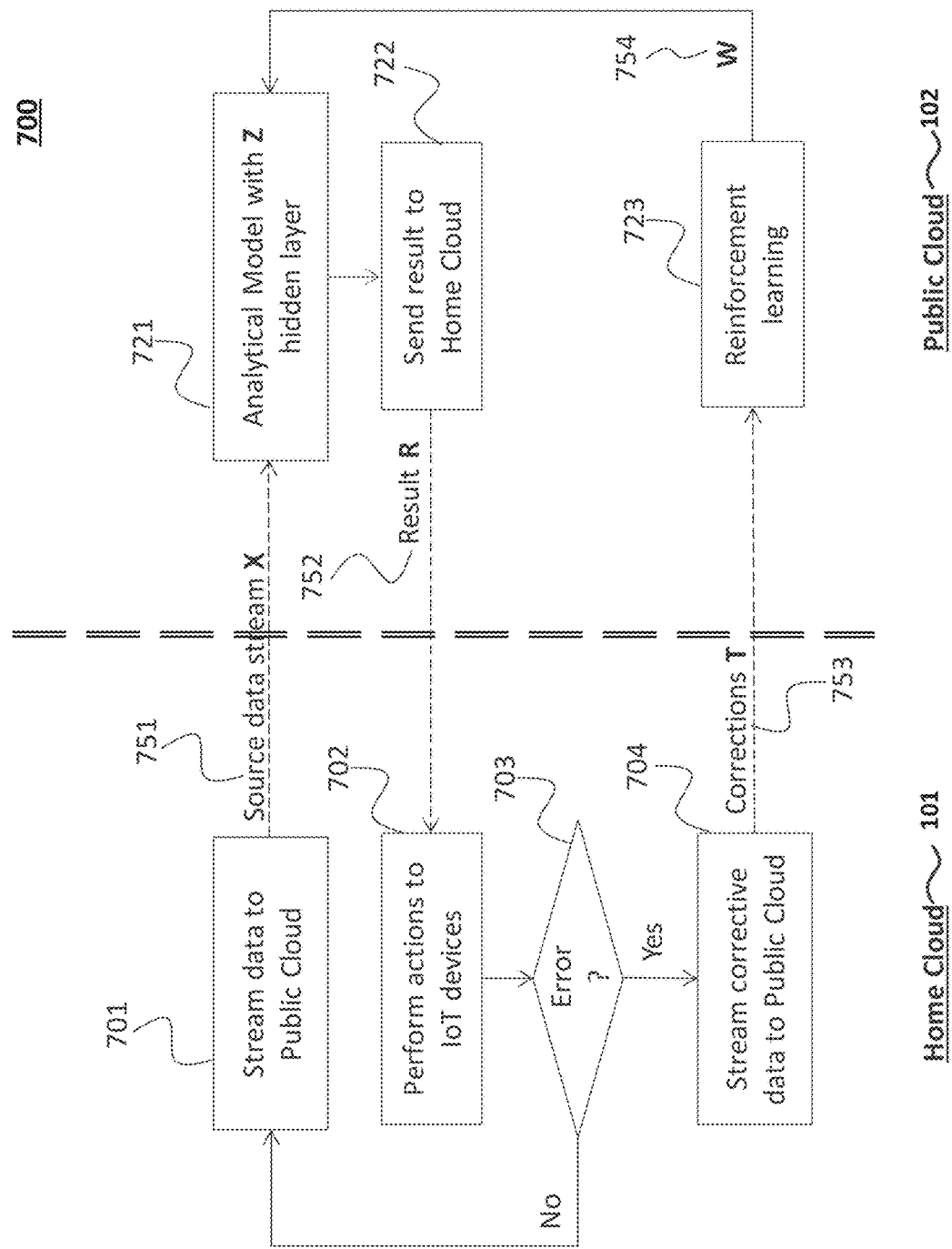
FIG. 7 shows a HCC in accordance with an embodiment, where the HCC allocates all of the data analytic and reinforcement training tasks to a PCC.

FIG. 7 shows process 700 for handling multimedia signals, in which the analytic model is executing at PCC 102. HCC 101 continuously streams source data 751 to PCC 102 at block 701. PCC 102 uses a model with Z hidden layers to analyze the data stream at block 721 to obtain predictive results R 752. The results are then sent back to HCC 101 at block 722, where HCC 101 applies the predictive results to the IoT ecosystem at block 702.

HCC 101 continuously monitors the IoT ecosystem for any corrections to the predictive results at block 703. If there are any corrections, HCC 101 provides corrections T 753 as feedback to PCC 102 at block 704.

PCC 102 performs reinforcement learning at block 723 to obtain a new set of parameters W 754. The new parameters are then applied to the analytic model at block 721 for the subsequent source data stream.

Figure 8:
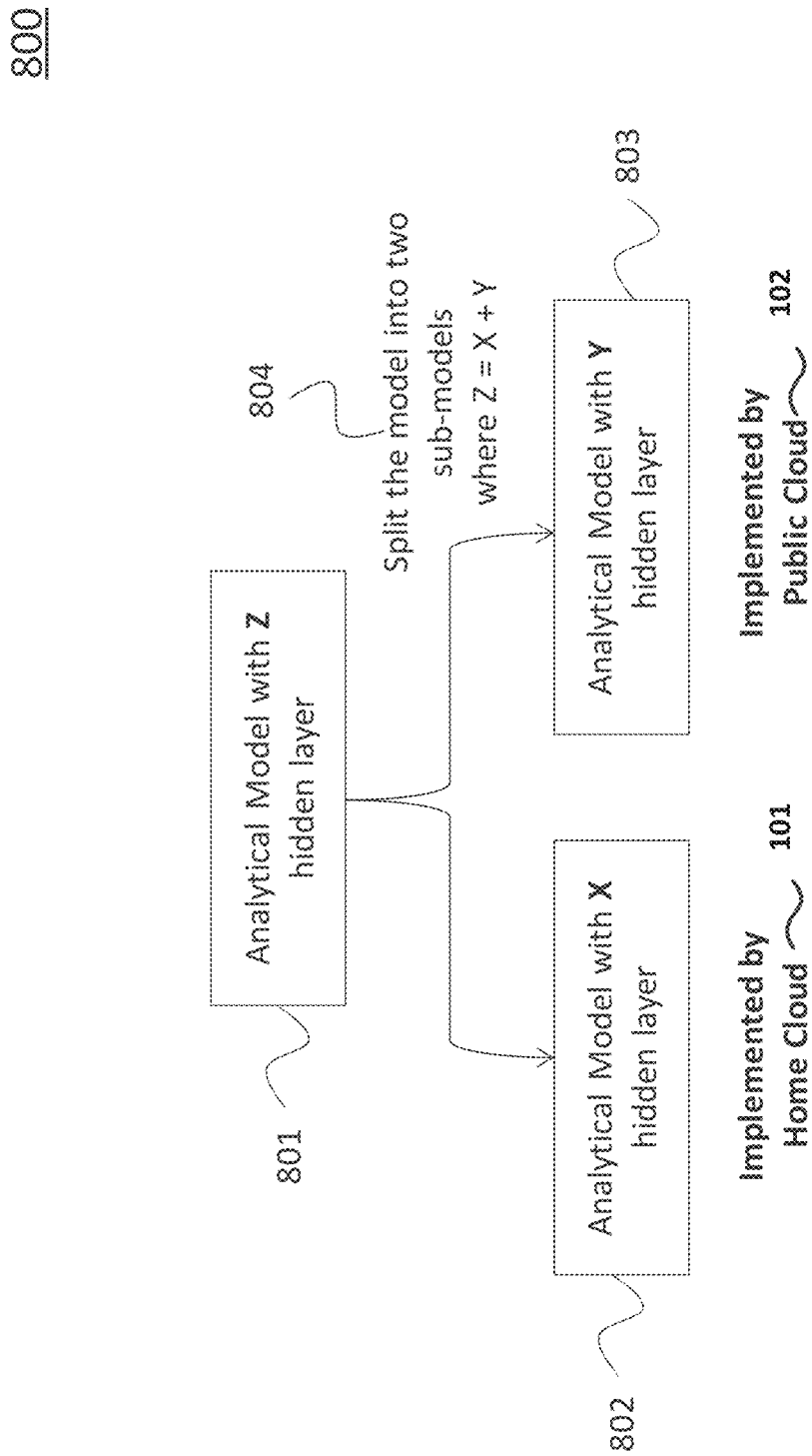
FIG. 8 shows an approach for a HCC partitioning an analytic model into two sub-models in accordance with an embodiment. Part of the original model is executed at the HCC, and the remaining part of the model is executed at a PCC in order to reduce the computation at the HCC to reduce data traffic and preserve data privacy when sending data over the network.

FIG. 8 shows an analytic model with Z hidden layers 801, which may be split into two sub-models 804, one with X hidden layers 802 (implemented at HCC 101) and another with Y hidden layers 803 (implemented at PCC 102), where X+Y=Z. With application 800, the source data stream from one or more IoT devices is analyzed at HCC 101. The output from the $x^{th}$ hidden layer of hidden layers 802 is then sent to PCC 102 to continue the analysis through hidden layers 803.

Using the method 800, the amount of data sent from HCC 101 to PCC 102 is typically reduced. Moreover, the privacy of user data may be protected by sending a version of transformed data instead of the source data.

Moreover, the distribution of work load for executing the model may be based on:
  The computer power of the home computing cloud. (For example, HCC 101 executes the first layer of the analytic model and then sends the output to PCC 102. PCC 102 then executes the remaining layers of the analytic model.
  The amount of data traffic. (For example, HCC 101 executes layers of the analytic model until reaching a layer with the minimum number of output nodes. HCC would then send the output of this layer to a PCC 102. PCC 102 then executes the remaining layers of the analytic model).
  Data privacy. For example, HCC 101 may execute layers of the analytic model until a layer is reached, where its output is totally unrelated to the source data. HCC 101 then sends the output of this layer to PCC 102. PCC 102 then executes the remaining layers of the analytic model.
  The consistency of the model parameters. For example, HCC 101 executes layers of the analytic model that have fixed parameters. HCC 101 then sends the output of the last layer to PCC 102. PCC 102 then executes the remaining layers of the analytic model).

The capability of HCC 101 may vary from those with basic configuration that only allows analytic model to be executed to more powerful ones that are equipped with more powerful hardware for training analytic models with multiple hidden layers.

With another implementation to further improve data privacy, an analytic model may be split into three sub-models. In this case, the input processing layers and the output layer(s) are executed at HCC 101, and some or all of the hidden layers are executed at PCC 102. In this case, the raw input data and the predictive outputs, which are closely related to the users, are locally kept.

Figure 9:
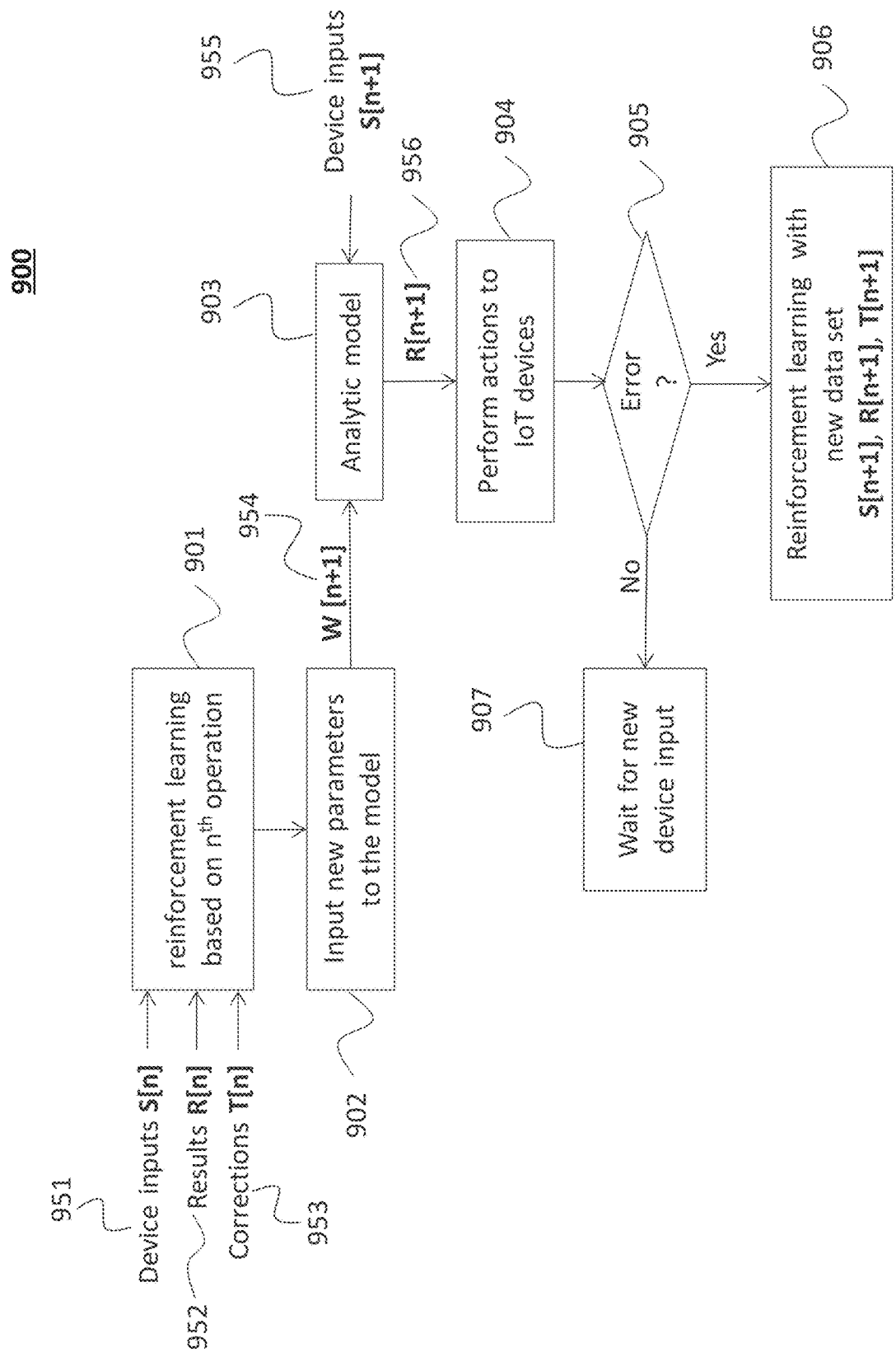
FIG. 9 shows an approach for a HCC executing reinforcement learning in accordance with an embodiment.

FIG. 9 shows logic flow 900 for locally executing reinforcement learning at HCC 101. Reinforcement learning is executed at block 901. HCC 101 uses input data S[n] 951, predictive outputs R[n] 952, and corrections T[n] 953 at $n^{th}$ operation to optimize the set of parameters W for the analytic model by minimizing an error function.

When the training is completed, the new set of parameters W[n+1] 954 is provided to the analytic model at block 902 so that the analytic model can utilize them at block 903. When there are new device inputs S[n+1] 955 from one or more IoT devices, new predictive results R[n+1] 956 may be applied to the IoT ecosystem at block 904.

If there are corrections by users at block 905, the reinforcement learning algorithm repeats execution at block 906 using the data (S, R and T) from the $[n+1]^{th}$ instance. Otherwise, HCC 101 waits for inputs at block 907.

With some applications, training of analytic model may be too demanding for the computer resources at HCC 101. In such situations, PCC 102 may be used to assist reinforcement learning at HCC 101.

Figure 10:
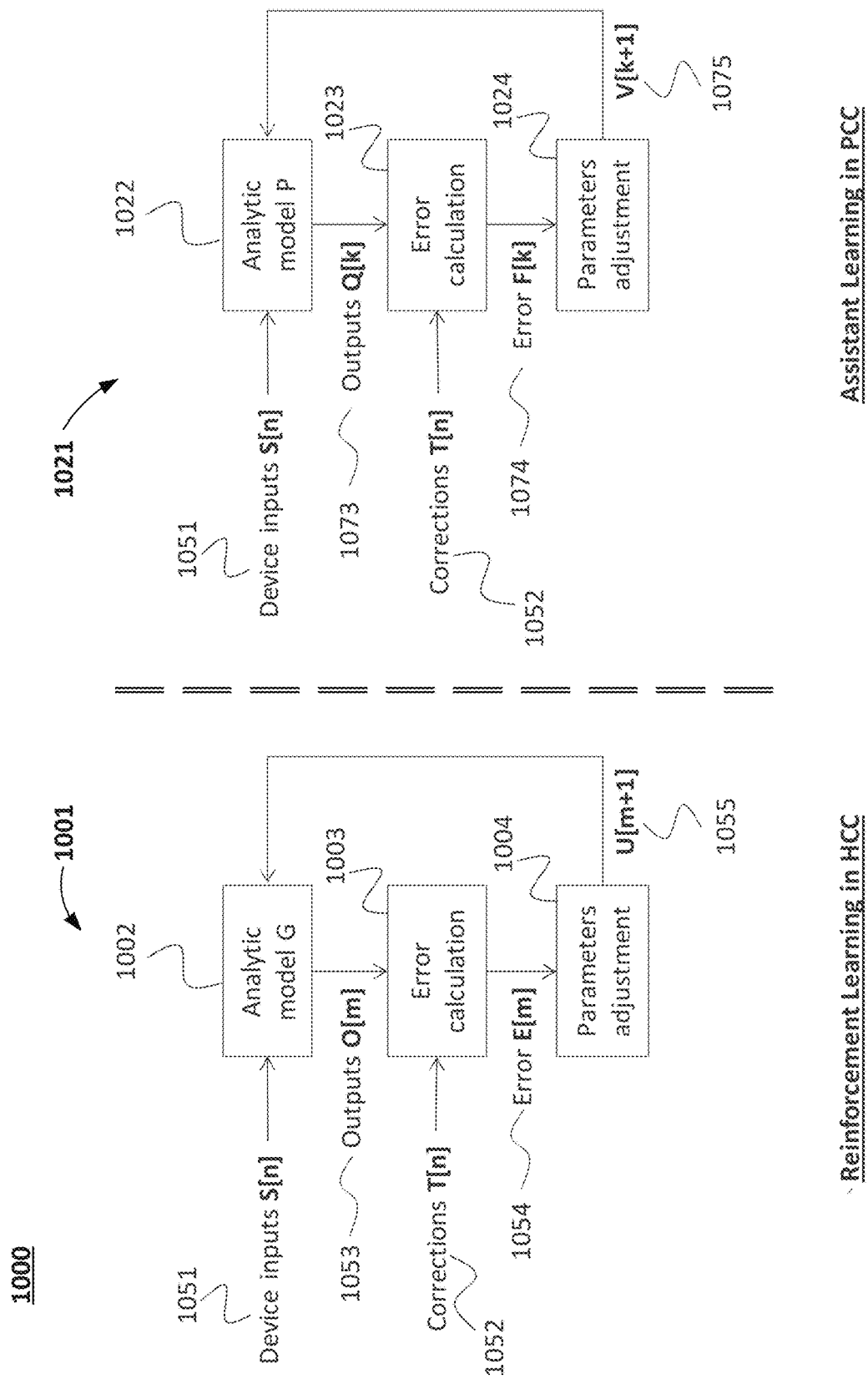
FIG. 10 shows an approach for a HCC interacting with a PCC to perform assistant learning in accordance with an embodiment.

FIG. 10 shows logic flow 1000 for assistant training (parallel training), where HCC 101 performs training during training sequence 1001, and PCC 102 performs parallel training during training sequence 1021.

HCC 101 performs reinforcement learning using device inputs S[n] 1051 and an analytic model G at block 1002. The predictive output O[m] 1053 from the analytic model G is compared with the corrections from user T[n] 1052 to compute an error measure E[m] 1054 at block 1003. Adjustment to the model parameters is determined based on the magnitude of the error value and rate of change of the error values between iterations at block 1004. The new set of parameters U[m+1] 1055 is then used by the analytic model G at block 1002 to calculate a new output O[m+1] using the same device inputs S[n]. A new error measure E[m+1] is then computed by comparing T[n] and O[m+1]. Additional iterations may be performed until a desired error measure is obtained.

While reinforcement learning is being performed at HCC 101, a copy of device inputs S[n] 1051 and the corrections T[n] 1052 is sent to PCC 102, for example, via data channel 151. PCC 102 performs similar reinforcement learning process at block 1021 to assist model training at HCC 1001. Correspondingly, device inputs S[n] 1051 are executed by analytic model P at block 1022. The predictive output Q[k] 1073 from analytic model P at block 1022 is compared with the corrections from user T[n] 1052 to compute an error measure F[k] 1074 at block 1023. Adjustment to the model parameters is based on the magnitude of the error value and rate of change of the error values between iterations at block 1024. The new set of parameters V[k+1] 1075 is then used by analytic model P 1022 to calculate a new output Q[k+1] using the same device inputs S[n], and a new error measure F[k+1] is computed by comparing T[n] and Q[k+1], and so forth.

PCC 102 may use an identical algorithm (where model P is a copy of model G) to change the model parameters U 1055 and V 1075. Alternatively, different algorithms (where model P is not a copy of model G) may be used for adjusting the model parameters U 1055 and V 1075.

During the assistant training, the error measures from the two learning models (G at bock 1002 and P at block 1022) may be consistently compared. If there is substantial difference between the two error measures consistently, both learning models G and P may select (switch to) the set of model parameters that yields the lower error measures and continue the training.

The training may be terminated if any of the two models G and P meets a target error threshold, where the set of model parameters that meets error threshold is used by the analytic model at HCC 101.

At the end of reinforcement learning, HCC 101 may upload the trained model to PCC 102 for archiving, sharing, or optimization.

PCC 102 may analyze all the received models from other HCC's and optimize a new model from them. With some embodiments, a new model may be trained when a new default IoT device is added. PCC 102 may distribute the new model to all HCC's.

HCC 101 may decide to use the new model as provided by PCC 102, use the new model with the parameters from the original model, or totally ignore the new model. The decision may be based on a comparison to the error measures when executing different models using the empirical data locally stored.

HCC 101 may decide to execute reinforcement learnings at any time during an operation, for example according to block 621 (as shown in FIG. 6), block 723 (as shown in FIG. 7), block 906 (as shown in FIG. 9), or process 1000 (as shown in FIG. 10).

In refinement learning, legacy IoT device data stored locally at HCC 101 may be used to train the analytic model (for example, a continual improvement to the original model). Alternatively, new IoT device data may be used to train the analytic model (for example, a new analytic model with an additional device type). Alternatively, a mix of both the legacy and new IoT device data may be used to execute the original model and to train the new model in parallel.

Weightings may be assigned in computing the error measures during reinforcement learnings. For example, with object recognition, more weight may be allocated to recognition errors than to the errors in confidence level.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A home computing system supporting at least one Internet of Things (IoT) device, the home computing system comprising:
    a communications gateway configured to interface with the at least one IoT device;
    a cloud interface configured to exchange information with a public computing cloud;
    a processor for executing computer-executable instructions;
    a memory storing the computer-executable instructions that when executed by the processor cause the home computing system to:
        send configuration data about the home computing system, wherein the configuration data is descriptive of the home computing system;
        download, from the public computing cloud via the cloud interface, a downloaded data analytic model based on the configuration data;
        obtain device data from the at least one IoT device via the communications gateway;
        apply the device data to the downloaded data analytic model;
        obtain a first predictive result from the downloaded data analytic model based on the device data;
        determine a first error measure based on the first predictive result and corrections information to the first predictive result;
        when the first error measure exceeds a predetermined threshold, initiate reinforcement learning at the public computing cloud based on the device data, the first predictive result, and the corrections information;
        in response to the sending, receive revised model parameters from the public computing cloud; and
        apply the revised model parameters to the downloaded data analytic model.

2. The home computing system of claim 1, wherein the memory storing computer-executable instructions that when executed by the processor further cause the home computing system to:

when the first error measure does not exceed the predetermined threshold, apply the first predictive result to the at least one IoT device.

3. The home computing system of claim 1, wherein the memory storing computer-executable instructions that when executed by the processor further cause the home computing system to:
when a new IoT device added to the home computing system, download, from the public computing cloud, a new data analytic model;
apply current model parameters to the new data analytic model;
initiate reinforcement learning for the new data analytic model;
in response to the initiating, obtaining new model parameters for the new data analytic model; and
reapply the new model parameters to the new data analytic model.

4. The home computing system of claim 3, wherein the new model parameters are received from the public computing cloud.

5. The home computing system of claim 1, wherein the memory storing computer-executable instructions that when executed by the processor further cause the home computing system to:
initiate reinforcement learning at the home computing system based on the device data, the first predictive result, and a first corrections information;
obtain first updated model parameters from the reinforcement learning; and
apply the first updated model parameters to the downloaded data analytic model to obtain an updated data analytic model.

6. The home computing system of claim 5, wherein the memory storing computer-executable instructions that when executed by the processor further cause the home computing system to:
apply the device data to the updated data analytic model;
obtain a second predictive result from the updated data analytic model based on the device data;
determine a second error measure based on the second predictive result and a second corrections information to the first predictive result;
when the second error measure exceeds a desired error level, repeat the reinforcement learning;
obtain second updated model parameters from the repeated reinforcement learning; and
reapply the second updated model parameters to the downloaded data analytic model.

7. The home computing system of claim 6, wherein the memory storing computer-executable instructions that when executed by the processor further cause the home computing system to:
when computational resources at the home computing system are exceeded, request cloud resources at the public computing cloud to perform the reinforcement learning.

8. The home computing system of claim 5, wherein the memory storing computer-executable instructions that when executed by the processor further cause the home computing system to:
upload the updated data analytic model to the public computing cloud.

9. The home computing system of claim 1, wherein the memory storing computer-executable instructions that when executed by the processor further cause the home computing system to:

execute reinforcement learning of the downloaded data analytic model by the processor at the home computing system;
obtain a first set of model parameters from the reinforcement learning at the home computing system;
initiate assistant learning at the public computing cloud based on the device data, wherein the assistant learning is performed in parallel with executing the downloaded data analytic model at the home computing system;
obtain a second set of model parameters from the assistant learning at the public computing cloud; and
comparing a third error measure for the reinforcement learning and a fourth error measure for the assistant learning.

10. The home computing system of claim 9, wherein the assistant learning utilizes a copy of the downloaded data analytic model.

11. The home computing system of claim 9, wherein the memory storing computer-executable instructions that when executed by the processor further cause the home computing system to perform:
when the third error measure is less than the fourth error measure, select the first set of model parameters from the first and second set of model parameters; and
apply the first set of model parameters to the downloaded data analytic model executing at the home computing system.

12. The home computing system of claim 9, wherein the memory storing computer-executable instructions that when executed by the processor further cause the home computing system to:
when the third error measure is greater than the fourth error measure, select the second set of model parameters from the first and second set of parameters; and
apply the second set of model parameters to the data analytic model executing at the home computing system.

13. The home computing system of claim 9, wherein the memory storing computer-executable instructions that when executed by the processor further cause the home computing system to:
terminate training of the downloaded data analytic model when one of the third error measure and the fourth error measure is less than a target error threshold.

14. The home computing system of claim 13, wherein the memory storing computer-executable instructions that when executed by the processor further cause the home computing system to:
in response to the terminating, upload the downloaded data analytic model to the public computing cloud.

15. A home computing system supporting at least one Internet of Things (IoT) device, the home computing system comprising:
a communications gateway configured to interface with the at least one IoT device;
a cloud interface configured to exchange information with a public computing cloud;
a processor for executing computer-executable instructions;
a memory storing the computer-executable instructions that when executed by the processor cause the home computing system to:
send configuration data about the home computing system, wherein the configuration data is descriptive of the home computing system;

download, from the public computing cloud via the cloud interface, a downloaded data analytic model based on the configuration data;

obtain device data from the at least one IoT device via the communications gateway;

apply the device data to the downloaded data analytic model;

obtain a first predictive result from the data analytic model based on the device data;

when a new IoT device added to the home computing system, download, from the public computing cloud, a new data analytic model;

apply current model parameters to the new data analytic model;

initiate reinforcement learning for the new data analytic model;

in response to the initiating, obtaining new model parameters for the new data analytic model; and reapply the new model parameters to the new data analytic model.

16. A home computing system supporting at least one Internet of Things (IoT) device, the home computing system comprising:

a communications gateway configured to interface with the at least one IoT device;

a cloud interface configured to exchange information with a public computing cloud;

a processor for executing computer-executable instructions;

a memory storing the computer-executable instructions that when executed by the processor cause the home computing system to:

send configuration data about the home computing system, wherein the configuration data is descriptive of the home computing system;

download, from the public computing cloud via the cloud interface, a downloaded data analytic model based on the configuration data;

obtain device data from the at least one IoT device via the communications gateway;

apply the device data to the downloaded data analytic model;

obtain a first predictive result from the downloaded data analytic model based on the device data;

initiate reinforcement learning at the home computing system based on the device data, the first predictive result, and a first corrections information;

obtain first updated model parameters from the reinforcement learning; and apply the first updated model parameters to the data downloaded analytic model to obtain an updated data analytic model.

17. A home computing system supporting at least one Internet of Things (IoT) device, the home computing system comprising:

a communications gateway configured to interface with the at least one IoT device;

a cloud interface configured to exchange information with a public computing cloud;

a processor for executing computer-executable instructions;

a memory storing the computer-executable instructions that when executed by the processor cause the home computing system to:

send configuration data about the home computing system, wherein the configuration data is descriptive of the home computing system;

download, from the public computing cloud via the cloud interface, a downloaded data analytic model based on the configuration data;

obtain device data from the at least one IoT device via the communications gateway;

apply the device data to the downloaded data analytic model;

obtain a first predictive result from the downloaded data analytic model based on the device data;

execute reinforcement learning of the downloaded data analytic model by the processor at the home computing system;

obtain a first set of model parameters from the reinforcement learning at the home computing system;

initiate assistant learning at the public computing cloud based on the device data, wherein the assistant learning is performed in parallel with executing the downloaded data analytic model at the home computing system;

obtain a second set of model parameters from the assistant learning at the public computing cloud; and comparing a third error measure for the reinforcement learning and a fourth error measure for the assistant learning.

* * * * *